United States Patent
Wetzel

[15] 3,701,426
[45] Oct. 31, 1972

[54] COMPACT SEWAGE TREATMENT APPARATUS

[72] Inventor: Robert D. Wetzel, Marshfield, Mass.

[73] Assignee: James R. O'Connor, Arlington, Mass.; a part interest

[22] Filed: Nov. 18, 1971

[21] Appl. No.: 200,160

[52] U.S. Cl. .................. 210/152, 210/199, 210/205
[51] Int. Cl. ........................... C02b 3/06, C02c 5/06
[58] Field of Search...... 210/16, 17, 61, 62, 152, 195, 210/199, 205, 209

[56] References Cited

UNITED STATES PATENTS

| 2,988,221 | 6/1961 | Culp | 210/62 X |
|---|---|---|---|
| 3,202,285 | 8/1965 | Williams | 210/195 |
| 3,327,855 | 6/1967 | Watson et al. | 210/152 X |
| 3,347,784 | 10/1967 | Kappe | 210/195 X |
| 3,407,935 | 10/1968 | Burton | 210/17 X |
| 3,451,552 | 6/1969 | Carlson | 210/152 |
| 3,472,390 | 10/1969 | Pall et al. | 210/152 X |

Primary Examiner—Reuben Friedman
Assistant Examiner—Thomas G. Wyse
Attorney—James R. O'Connor

[57] ABSTRACT

A compact, compartmentalized sewage treatment apparatus housed in a single tank having a length appreciably greater than its height in which sewage discharged into the apparatus is progressively clarified by anerobic bacterial decomposition, primary sedimentation and flotation, chemical attack to reduce coliform bacteria and BOD, and secondary sedimentation, flotation and filtration to highly clarify the effluent for discharge into lakes, rivers, harbors and other water courses.

21 Claims, 3 Drawing Figures

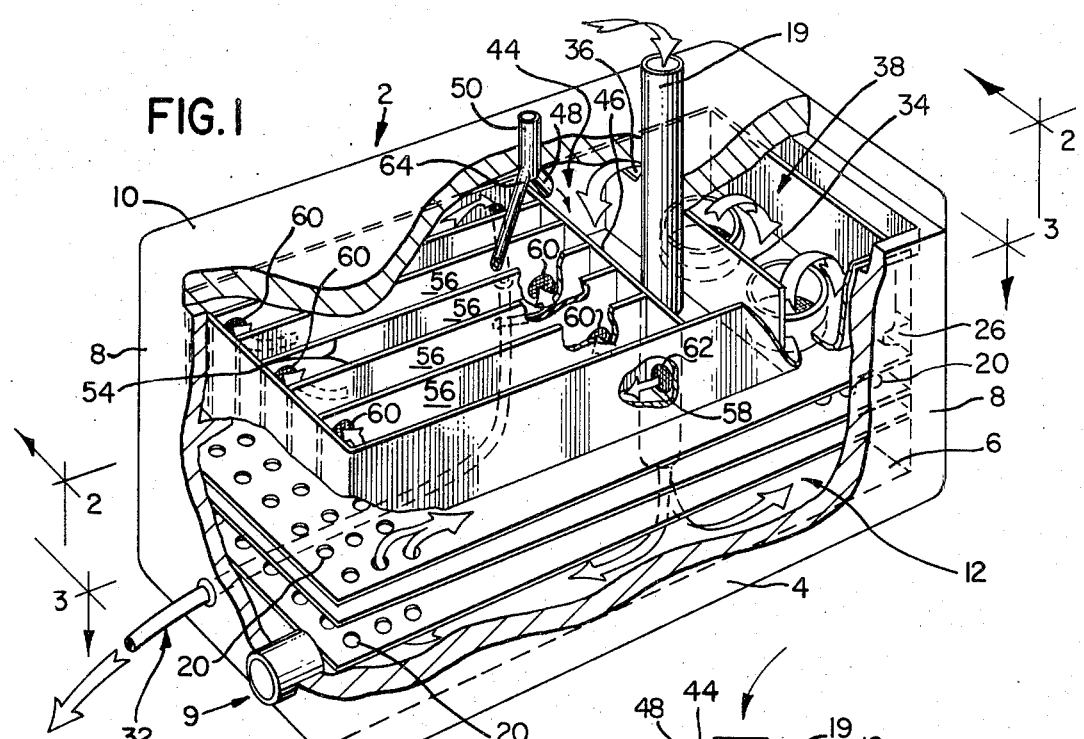
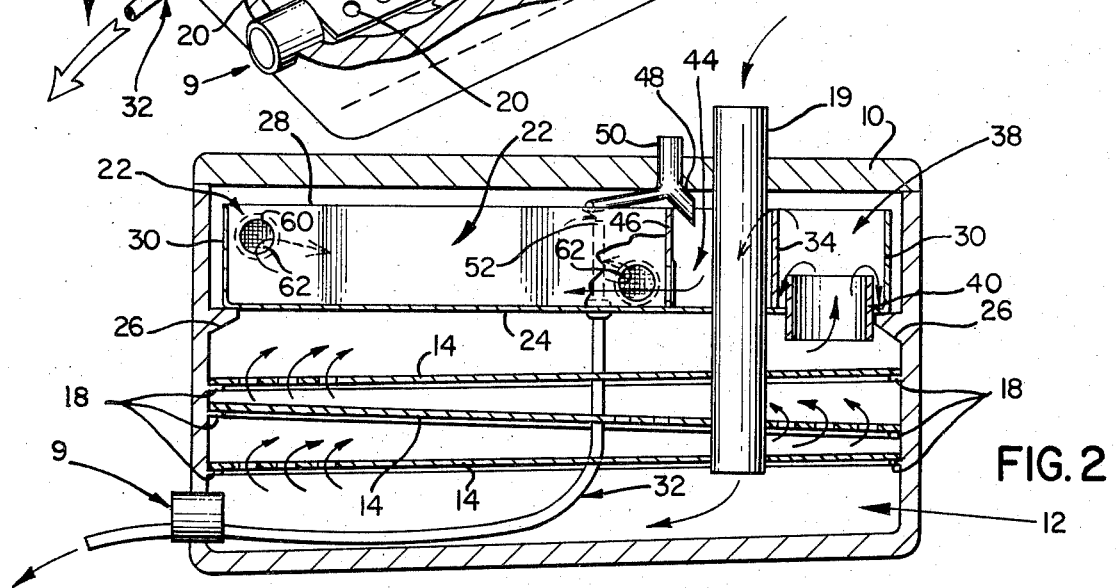
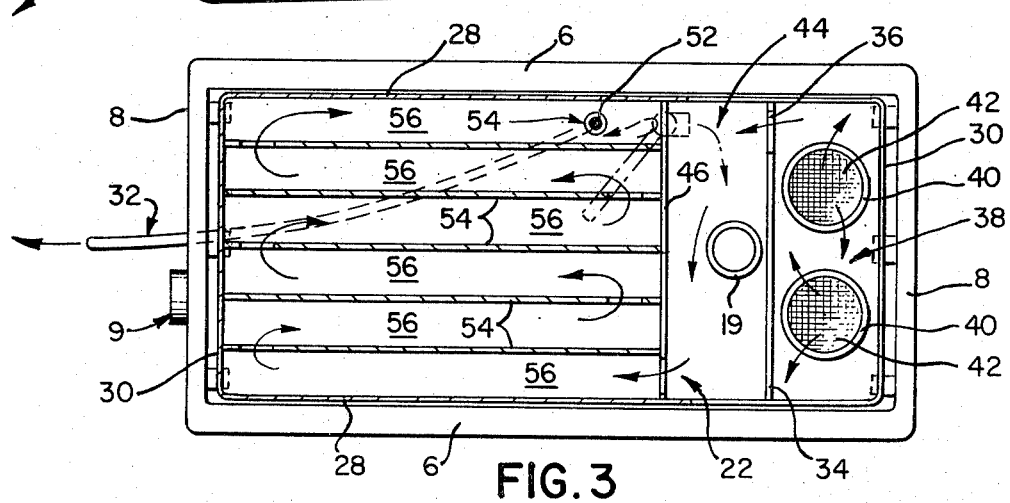

COMPACT SEWAGE TREATMENT APPARATUS

BACKGROUND OF THE INVENTION

1. Field of the Invention

The invention relates to sewage treating apparatus of the type generally found in U.S. Art Class 210 titled "Liquid Purification or Separation" and more particularly to apparatus of a compact and frequently portable nature found in Subclass 199 subtitled "With Means to Add Treating Material—Spaced Along Flow Path."

2. Brief Description of the Prior Art

The development of the invention disclosed herein was principally motivated by the recognition of the need for a sewage treatment apparatus particularly adapted for use in small marine pleasure craft equipped with marine toilets. That is not to say that the invention might not find ready application in other installations wherein space limitations are critical or even in larger craft which are not equipped with a central sewage treatment apparatus. The merits of the invention will be best understood, however, by considering same in the frame of reference of its adaptability for small pleasure craft installations.

Smaller craft of course frequently sail inland waterways, to wit, lakes, rivers, harbors, bays, and the like water courses. In the past, the practice has usually been to discharge sewage from marine toilets overboard and this practice has contributed in no small measure to the deplorable condition of our domestic waterways which presently exists. To rectify this condition, both federal and state environmental protection agencies have sought or will increasingly be seeking the enactment of legislation which will prohibit the dumping of untreated or raw sewage overboard and such legislation will no doubt be enforced by, among other measures, denial of registration by regulatory agencies to any craft which is not equipped with sewage treating apparatus.

It has also been a more limited past practice to utilize on board sewage holding tanks which stored sewage for a limited period of time and required frequent pumping out at dock side into municipal or private sewage systems and treating plants. Notwithstanding this inconvenience, which does not particularly recommend storage tanks to pleasure craft owners, space limitations severely limit the size of such tanks (thus requiring more frequent pumping or emptying), the tanks present a safety hazard particularly if they must be installed below the water line, i.e., they are generally not acceptable to regulatory agencies such as the Coast Guard, and it is highly unlikely that they will satisfy environmental protection agencies in that sewage stored in tanks which can be mounted in smaller craft can be readily dumped overboard from the tanks into water courses by those who would violate antipollution laws.

In view of the continually increasing public interest in and demand for effective water pollution controls, it is not surprising to learn that others have in recent years recognized the need for sewage treatment facilities in smaller boats and other installations wherein space for mounting same is limited. One individual who has is Mr. Rollin L. Fifer of Louisville, Kentucky, to whom U.S. Pat. Nos. 3,460,677 and 3,476,250 issued in 1969. Reference may be had to Fifer's patents for a further detailed explanation of the need for sewage treating systems in smaller craft and the disclosure of a relatively small, compact unit having a length in excess of its height and width which is suited for the type of installations under consideration. While I am not aware of any present commercial usage of the apparatus disclosed by Fifer, I believe it is only fair to recognize that he has made a meritorious contribution to the art, particularly with respect to the compactness of his device and his teaching that the length of the apparatus must exceed its height and at the same time function as efficiently or even more efficiently than previously known treatment systems in order to be acceptable for small craft utilization.

Thus, while recognizing the significance of Fifer's teachings, it is the object of this invention to provide a still further improvement in the art. To that end I have developed a sewage treatment apparatus which: (a) is of such compact size as to be practical for usage aboard craft as small as 20 feet in length; (b) relies solely on the force of gravity to induce effluent flow; (c) is mechanically simple in that it has no moving parts per se (Fifer's apparatus requires a system of pipes, valves, manifolds and presumably a pump or compressed air source to continuously inject air, i.e., oxygen, into a desired circulation pattern in his tank), and thus is particularly conductive for economic production and sale in the market for which it is intended; (d) is designed to achieve almost complete separation of solids and liquids during flow of effluent through the apparatus to effect a very substantial reduction of BOD, (Fifer by comparison makes almost no attempt to separate solids, but to the contrary specifically seeks to keep solid matter continuously in suspension); (e) provides for a concentration of heavier solids in a holding tank wherein anerobic degradation of the sewage is effected, (Fifer by comparison relies solely on aerobic bacterial action); (f) provides for the filtration of effluent flowing downstream from the above mentioned holding tank, the chemical treatment of relatively clear, previously filtered effluent, and further separation of solids and liquids in the chemically treated effluent by settling, flotation and subsequent filtration processes to effect neutralization of coliform bacteria and a very substantial reduction of the BOD of effluent prior to discharge. Conversely, Fifer provides for chemical treatment only and makes little or no attempt to effect solid separation by any of the processes of settling, flotation and filtration. Further appreciation of the contribution to the art of the present sewage treatment apparatus will be had by one who now proceeds to a consideration of the detailed description of a preferred embodiment of same which follows hereinafter.

SUMMARY OF THE INVENTION

A compact, compartmentalized sewage treatment apparatus, the length of which is substantially greater than its height and width. A single tank has a primary effluent receiving chamber in the bottom region thereof into which sewage effluent is discharged from an intake pipe. In this region of the tank heavier solids settle out of the effluent toward the tank base and biological decomposition of the effluent by anerobic micro-organisms takes place. In the primary holding chamber, but above the bottom region thereof, there are a plurality of planar, horizontal baffles spacedly stacked above one another and having openings alternately disposed adjacent opposite ends thereof. The baffles provide a tortuous path through which effluent flows downstream under gravitational impetus as the tank fills and, during which flow, sedimentation and anerobic decomposition continues. Supported within the tank is a separate tray having sides, ends, and a base disposed above the uppermost of the horizontal baffles. At one end of the tray a plurality of primary, relatively large and coarse filters are seated at one end of ducts extending below the base of the tray and leading to a secondary holding chamber into which partially clarified effluent flows downstream through the said primary filters. A chemical treatment chamber is located longitudinally adjacent the secondary holding chamber and is separated therefrom by a transverse, vertical baffle having a cut out at one end thereof providing a weir over which effluent flows into the chemical treatment chamber responsive to filling of the secondary holding chamber. A nozzle which is attached to the tank communicates with the chemical treatment chamber for the periodic injection of a desired chemical solution into the effluent present in said chamber to effect the neutralization of coliform bacteria and reduce the biological oxygen demand of the effluent. At the downstream end of the chemical treatment chamber, a second transverse baffle extends across the width of the tray and the latter baffle has an opening adjacent the base thereof communicating with the first of a plurality of settling and flotation chambers defined by a plurality of spaced, longitudinal baffles joined to the base of the tray and extending from the downstream side of the last mentioned transverse baffle to the opposite end of the tray. Each of the settling and flotation chambers communicates with the adjacent downstream chamber through openings in the longitudinal baffles, which openings are alternately disposed at opposite ends of the said baffles and alternately are vertically spaced so as to be adjacent the top, bottom, top, etc., of succeeding baffles relative to the downstream flow path of the effluent. Each of the aforesaid openings in the last mentioned transverse baffle and the longitudinal baffles may have a filter overlying the upstream side thereof, with the said filters being of progresssively finer mesh in relation to the downstream flow path. Thus, the settling and flotation chambers provide an extended flow path for the further separation of solids and liquids by flotation, sedimentation and filtration during the relatively quiescent downstream flow of the effluent. A conduit for the discharge of highly clarified effluent from the apparatus communicates with the upper region of the most downstream of said settling and flotation chambers. Ideally, the apparatus may include a second nozzle disposed to inject additional chemical into one of the intermediate of said settling and flotation chambers to effect a concentrated chemical attack on any remaining bacteria and a further reduction of the BOD of the already highly clarified effluent upstream of but relatively proximate the discharge conduit.

BRIEF DESCRIPTION OF THE DRAWING

FIG. 1 is a perspective view of a sewage treatment apparatus according to the invention depicting portions of a side, cover and end of the tank removed and in section, and portions of certain internal components of the apparatus removed;

FIG. 2 is a cross section taken on line 2—2 of FIG. 1; and

FIG. 3 is a cross section taken on line 3—3 of FIG. 1.

DESCRIPTION OF A PREFERRED EMBODIMENT

A typical sewage treatment apparatus according to the invention comprises a generally rectangular tank 2 having a base 4, upstanding sides and ends 6,8 respectively, and a removable cover 10. As depicted in FIG. 2, base 4 may be slightly sloped toward one end 8 of the tank. A normally capped pipe 9 leads into the tank adjacent the bottom of its left end 8. The pipe 9 is adapted for connection to a hose to facilitate the periodic pumping out of any sludge collected on the base 4 or for complete emptying of the tank to effect periodic, e.g., annual, semi-annual, etc., cleaning of the apparatus according to the extent of its usage. While the external dimensions of the tank may vary as the demands of a particular installation dictate, experience to date has indicated that a unit for handling the effluent from a marine toilet installed in a boat with accommodations for four persons to live aboard can be as small as 30 inches×16 inches×16 inches under relatively normal usage conditions. A unit to handle the toilet effluent for two persons can be as small as 26 inches×12 inches×12 inches. In any event, it is highly desirable or even imperative that the length-to-height ratio of a unit acceptable for small craft installations be greater than one. The tank must of course be fabricated from an impervious material, ideally a lightweight, corrosion-resistant synthetic plastic. In fact, it has been found that all the components of the apparatus particularly lend themselves to manufacture from synthetic plastics, by molding, laminating, extruding, weaving, etc.

The inside of the tank 2 per se is hollow and for the purpose of this disclosure the bottom region thereof is referred to as the most upstream region of the apparatus and the tank. This bottom or most upstream region of the tank defines a primary holding chamber 12 the top or most upstream region of which is defined by the base of a tray seated in the tank, which will be described in detail hereinafter. Intermediate the height of the primary holding chamber 12, three planar, generally horizontal, vertically spaced baffles 14 extend between the internal walls defined by the sides and ends of the tank. Horizontal baffles 14 are fixed to and supported in vertically spaced relationship by support elements 18 which project inwardly from the end walls of the tank.

An effluent intake pipe 19 which is connected to the discharge line of the marine toilet extends through an appropriately sized opening in the cover 10 of the tank, through the base of the aforementioned tray, through the longitudinal baffles and terminates below the baffles but above the base of the tank, whereby sewage effluent from the toilet is initially discharged into primary holding chamber 12 at substantially the most upstream region of the apparatus. As the primary holding chamber fills, heavier solids in the effluent will settle out of solution onto the base 4 of the tank and air (oxygen) or other gasses will rise upwardly out of the chamber toward the cover 10 of the tank. This purging of air from the lowermost region of the apparatus creates the ideal environment for continuing digestion and decomposition of the sewage in this region by anerobic bacteria which are of course highly active in a limited dissolved oxygen environment. Thus, initial treatment by way of separation of solids and liquids and reduction of BOD by anerobic biological degradation of organic matter present in the effluent is effected in the lowermost region of the primary holding chamber 12.

Early in the development of the apparatus, it was recognized that conditions peculiar to the marine environment in which it would be utilized would precipitate turbulence in the primary holding chamber 12 thus creating a counteraction to the settling action desired to effect primary separation of solids and liquids in the said chamber. To minimize this adverse effect of turbulence and for other reasons to be detailed hereinafter, the longitudinal baffles 14 were incorporated in the apparatus. As is best seen in FIG. 1, and is further indicated by the flow path arrows in FIG. 2, each of the horizontal baffles has a plurality of spaced apertures 20 disposed proximate one end thereof and at opposite ends of vertically adjacent baffles. This arrangement of the apertures 20 provides for an extended flow path of partially clarified effluent upwardly or downstream from the lowermost region of the primary holding chamber. One will observe that the area defined by the openings 20 constitutes only a minor portion of the overall area of each baffle and that each opening per se is relatively small. Hence, while some solid particulate matter will pass through the openings, larger flocs will be inhibited from passage and will be retained in the lower settling chamber for further decomposition thereof. It will also be noted that the vertical space between the baffles is quite limited so as to provide for quiescent flow along the extended path and further minimization of the effects of turbulence. Additionally, while anerobic bacterial action will continue as the effluent traverses the extended flow path, the aforementioned relative quiescence will enhance additional settling of solids onto the planar surfaces of the baffles. Having recognized that this additional settling will occur, it was determined to be advantageous to mount the baffles so that each would slope slightly downwardly (see FIG. 2) from the horizontal toward the apertured end thereof and the base of the tank, whereby solid particulates settling out would tend to slide downwardly and drop back through the apertures 20 of the respective baffles and ultimately back into the holding chamber 12. The objective of course is to realize maximum liquid-solid separation and thus produce a substantially clarified, relatively solid-free effluent flowing downstream in the flow path above the uppermost of the baffles 14. To this end it has been further recognized that light eddy currents in the effluent and/or mild vibration of the longitudinal baffles induced by the normal pitching and rolling of a small craft will tend to agitate solid particulates settling onto the planar surfaces of the baffles and thus enhance the sliding descent of such particles toward the chamber 12.

The earlier mentioned, generally rectangular tray or subassembly 22 is mounted within the tank above the baffles 14 and includes a base 24 seated on support elements 26 projecting inwardly from the end walls 6 of the tank, and upstanding sides 28 and ends 30 which terminate proximate the undersurface of the cover 10 of the tank. As is best seen in FIGS. 2 and 3, the tray is narrower and shorter than the internal width and length of the tank, ergo its ends 30 and sides 28 are slightly spaced from the internal end and side walls of the tank. The spacing of the tray from the tank provides a perimentrical gap about the tray through which gases may escape upwardly toward the tank cover from the primary holding chamber 12, which gases are ultimately vented to the atmosphere overboard of the craft through effluent discharge line 32.

The components of the apparatus housed within or supported by the tray 22 will now be described in essentially a right to left sequence as viewed in the drawings, which direction corresponds relatively to the continuing downstream flow path of the sewage effluent. Spaced a desired distance longitudinally from the right end 30 of the tray 22, the distance being determined by the overall size (particularly the length) of the apparatus, is an impervious transverse baffle 34 which extends between the sides 28 of the tray and from the base thereof upwardly generally to the height of the sides, except for a small section toward the remote side of the tray (as viewed in FIG. 1) which is of slightly reduced height to provide a weir 36, the purpose of which will later be described. Transverse baffle 34 cooperates with the rightward end and side portions of the tray to define a secondary effluent holding chamber 38 downstream of the primary chamber 12.

Mounted in the base of the secondary holding chamber 38 are a pair of short generally tubular extensions 40 which extend through appropriately sized openings in the tray base in an air and liquid tight fitting therewith. As is best depicted in FIG. 2, the extensions 40 extend both above and below the level of the tray base 24. Primary filters 42 are fixed to the lower or most upstream ends of the extensions 40 so as to lie intermediate the underside of the tray base and the upper surface of the uppermost horizontal baffle 14. Since, as aforesaid, there will be some settling of heavier solid particulates out of effluent solution onto the uppermost horizontal baffle 14 and further, since there will be some flotation of lighter particles upwardly to the lever of the undersurface of the tray base 24, the positioning of the filters at the lower ends of the extensions 40 has the effect of locating the filter screens in the environment of the most substantially clarified effluent flowing downstream of the tortuous path defined by the horizontal baffles.

The filters 42 are ideally screens of single layer, woven monofilament of mesh openings in the range of 0.0004-0.010 inch. Screens of this type utilized in prototypes of the apparatus constructed to date have proved highly efficient in preventing passage of particulate solid matter larger than their pore size and in combination with the earlier described horizontal baffles comprise a system which will effectively remove over 90 percent of the solids from sewage effluent that passes this stage in the apparatus. In addition, the direction of effluent flow, i.e., upward with the upstream surface of the filters located on the bottom or underside thereof, facilitates automatic cleaning of accumulations of nonpassing solids from the filters by virtue of gravity and the normal turbulence common to the marine environment. Further, the filter screens are rendered nonclogging by virtue of the proper selection of filter screen area in relation to the maximum flow rate to be expected. It should be pointed out that while a pair of screens are depicted in the accompanying drawing, the number may be increased as desired depending upon the size of the apparatus and the work load expected to be imposed upon it. Typically, a filter screen area on the order of 65 sq. inches will function satisfactorily at a maximum flow rate of three gallons per hour which is equivalent to six to eight flushes of a marine toilet during that time span. It is also critical to efficient functioning of the filters that the apparatus be provided with means for degassing the holding tank 12. Those familiar with filter operation will readily recognize that the filter screens, however permeable they may be to liquids and solids smaller than screen pore size, will be quite impermeable to gas when submerged in a liquid as normal operation of the present apparatus requires. Thus, as aforesaid, to provide for the purging of gases upwardly from the chamber 12 and ultimately overboard through discharge line 32, the tray 22 is perimetrically spaced from the internal side and end walls of the tank. Additionally, the use of multiple filter screens and the location of same appreciably below the base of the tray further reduces the possibility of the formation and entrapment of gas bubbles at the underside of the screens and contributes to efficient functioning of the system unhindered by air or gas lock.

The filling of primary holding chamber 12 and subsequent flow of effluent through primary filters 42 results in an ultimate filling of secondary holding chamber 38 and the progressive downstream flow of highly clarified, i.e., substantially solid-free effluent over weir 36 into the chemical treatment chamber 44, the downstream end of which is defined by a second transverse baffle 46 extending upwardly from the base 24 and between the sides 28 of the tray 22. Periodically, ideally coincident with each flush of the marine toilet, a measured amount of an appropriate chemical, for example, an acqueous solution of sodium hypochlorite is injected into the chamber 44 through nozzle 48 and the line 50 which leads to the tank from a chemical holding reservoir. To date it has been found convenient and efficient to utilize a simple, commercially available hand operated pump having a plunger which is depressed by the toilet user to force a predetermined (according to plunger setting) amount of chemical from the reservoir into the line 50 and the treatment chamber immediately after each toilet flush.

The total effect of the chemical is to neutralize all coliform bacteria in the sewage effluent, and, by reacting with the dissolved organic materials in the sewage, to reduce the BOD of the effluent to a safe level prior to discharge from the apparatus. To enhance the effectiveness of the chemical attack and reaction, it was found desirable to retain the chemically treated effluent in the apparatus for an extended time. To this end, the apparatus is provided with means defining an extended flow path for the effluent downstream of the chemical mixing chamber 44 and transverse baffle 46 toward the entering end 52 of the discharge line 32. The said means comprises a plurality of longitudinal baffles or gates 54 which are laterally spaced a predetermined distance from one another and the sides 28 of the tray, and extend upwardly from the base 24 of the tray and between the downstream side of the baffle 46 and the remote or left end 30 of the tray. Baffles or gates 54 cooperatively with each other and the sides of the tray thus define a plurality of settling and flotation chambers 56.

The first of the chambers 56, i.e., the forward most chamber as viewed in FIGS. 1 and 3, communicates with the chemical treatment chamber 44 through an opening 58 located adjacent the base and forward end of transverse baffle 46, each of the succeeding chambers 56 communicates with the next downstream chamber through openings 60 disposed alternately at opposite ends of adjacent baffles and alternately in vertically spaced relationship at the top and bottom of adjacent baffles, and the last or most downstream of the chambers communicates with the entering end 52 of the discharge line. The downstream extended flow path of effluent through the chambers 56 is clearly depicted by the alternately oppositely directed arrows at the left portion of FIG. 3.

In addition to providing an extended time for chemical reaction, the chambers 56 further enhance clarification in that additional settling and flotation of solids out of solution in the effluent will take place during downstream flow along the extended path. As is best seen in FIGS. 1 and 2, the openings 58, 60 in each of the baffles 46 and 54, respectively, have a fine mesh filter screen 62 overlying the upstream side thereof and each of these secondary filters becomes progressively finer, i.e., the pore size is reduced, relative to the downstream flow path. This secondary filtering action retains very fine solid particulates in the environment of the active chemical on the upstream side of each of the screens until the chemical action has reduced their size sufficiently to permit passage through the respective successive screens in the downstreamward sequence. Time delay for the passage of a given particular sewage slug through the chemical treatment portion of the apparatus is related to the number of toilet flushes per day, ergo the capacity of the treatment chamber 44 and the length of the downstream extended flow path should ideally provide for an average reaction time in the range of eight to 24 hours for a given boat size installation.

Having reference to FIG. 1 in particular, the reader will observe that the end of line 50 which leads back to the chemical reservoir is equipped with a second nozzle 64 of somewhat smaller diameter than the nozzle 48 and defines with the first nozzle an inverted T or Y at the terminal end of the line 50. Through this secondary nozzle a lesser amount of chemical is injected into one of the intermediate of the chambers 56 simultaneously with each injection into chemical treatment chamber 44, with the ratio of chemical divided between the two said chambers according to sizing of the respective nozzles. This injection of additional chemical into an already highly refined and clarified effluent provides for a very substantial reduction of BOD of the sewage, in that a concentrated chemical attack is directed at any remaining dissolved organic matter after depletion of the bulk of the chemical originally injected into the chamber 44. Thus, the effluent which eventually reaches the entrance 52 of discharge line 32 is almost totally liquid, i.e., in excess of 98 percent solid-free and the BOD of the effluent has been reduced over 95 percent from that of the sewage which enters the apparatus and to a level which is both safe for discharge and within the standards expected to be established under the Federal Water Pollution Control Act (Public Law 91-224; 84 Stat. 100-103).

The reader will of course appreciate that changes and modifications in the above described preferred embodiment may and no doubt will be effected according to the dictates of particular small craft installations. For example, while the number of chambers 56 depicted in the drawing is six, that number may readily be increased to extend the flow path and chemical reaction time by adding more gates or horizontal baffles 54. In another aspect, further experimentation may indicate that the transverse baffle 34 defining the downstream end of secondary holding chamber 38 can be eliminated without adversely affecting the functioning of the apparatus. At the present time the inclusion of that baffle to separate chemically treated effluent from the upstream non-treated effluent is considered desirable, in that the separation tends to inhibit the passage of chemical back through the primary filters into the lower holding chamber 12, which occurrence might well interfere with the anerobic degradation process since the chemical would kill active organisms sustaining bacterial action. However, it is recognized that further refinements in the invention might later render this possibility remote. It is also envisioned that chemicals in a powdered or substantially solid form might periodically be placed in the chamber 44 in lieu of injecting same into the chamber in a liquid form. Thus, it is submitted that the reader should consider the foregoing description in an illustrative rather than a limiting sense and, further, that one who seeks a clear definition of the scope of the invention protected by these letters patent should have reference to the claims which follow.

I claim:

1. A compact sewage treatment apparatus comprising: (a) a tank; (b) means for conveying effluent to said tank; (c) a primary effluent receiving and holding chamber in said tank, said means of clause (b) being disposed to discharge effluent into the substantially most upstream region of said primary chamber wherein heavier solids in the effluent settle out of solution and biological decomposition of the effluent by anerobic micro-organisms takes place, said primary chamber having means defining an extended length tortuous path downstream of said region through which partially clarified liquid flows responsive to the filling of the said region of said chamber with additional settling of solid particulates and continued anerobic decomposition of the effluent occurring during flow downstream through said tortuous path; (d) filtering means located in said tank downstream of said means defining said tortuous path, said filtering means being adapted to inhibit the passage of larger particulate matter in the partially clarified effluent downstream thereof and thereby retain said matter in said primary holding chamber for further anerobic decomposition of same; (e) a chemical treatment chamber located in said tank downstream of said filtering means for the reception of still further clarified effluent passed through said filtering means, wherein said last mentioned effluent is chemically treated by an appropriate chemical composition which reacts with organic material present in the effluent to effect a reduction of coliform bacteria and biological oxygen demand of the effluent present in said chamber; (f) means for receiving still further clarified effluent discharged from and flowing downstream of said chemical treatment chamber, said means defining an extended flow path which the effluent traverses subsequent to leaving said chemical treatment chamber to provide for still further separation of solids and liquids during passage of the effluent along said extended flow path; and (g) means communicating with the downstream region of said means of clause (f) for discharging highly clarified effluent from said apparatus.

2. A sewage treatment apparatus according to claim 1 wherein the length of said tank is appreciably greater than both its height and its width.

3. A sewage treatment apparatus according to claim 1 wherein the flow of effluent through said apparatus subsequent to its initial discharge into said primary holding chamber is induced solely by gravitational force.

4. A sewage treatment apparatus according to claim 1 wherein said means of clause (f), claim 1, comprises a plurality of substantially parallel, communicating settling and flotation chambers located substantially adjacent said chemical treatment chamber.

5. A sewage treatment apparatus according to claim 1 wherein said filtering means is disposed in the environment of the substantially most clarified effluent flowing downstream of said means defining said tortuous path, but upstream of said chemical treatment chamber.

6. A sewage treatment apparatus according to claim 1 including means connected to said tank for periodically discharging an appropriate chemical composition into said chemical treatment chamber.

7. A sewage treatment apparatus according to claim 4 wherein said primary effluent receiving and holding chamber is located adjacent the bottom of said tank, said means providing said tortuous path is disposed above the most substantially upstream region of said primary holding chamber, said filtering means is disposed above said means providing said tortuous path, said chemical treatment chamber is disposed above said filtering means, and said plurality of settling and flotation chambers are disposed substantially at the level of and longitudinally adjacent said chemical treatment chamber.

8. A sewage treatment apparatus according to claim 7 wherein said means defining said tortuous path comprises a plurality of longitudinal baffles spacedly superimposed on one another and spaced above the bottom of said tank and extending substantially between the internal side walls and end walls of said tank, each of said baffles having an opening formed therein for the passage of effluent therethrough in a downstream direction, said openings being alternately located substantially at the opposite ends of adjacent baffles.

9. A sewage treatment apparatus according to claim 8 wherein said baffles are alternately, planarly inclined in opposite longitudinal directions toward the bottom of said tank.

10. A sewage treatment apparatus according to claim 4 wherein said filtering means, said chemical treatment chamber and said flotation and settling chambers constitute components of a separate subassembly having a base disposed above said means defining said tortuous path, said subassembly being mounted within said tank below the top of said tank and in at least partially spaced relationship with respect to the internal peripheral walls of said tank.

11. A sewage treatment apparatus according to claim 10 wherein said filtering means is connected to the base of said subassembly by a conduit extending through an opening in said base and fixed to said base and projecting downwardly from said base a predetermined distance toward said means defining said tortuous path, said filtering means being fixed to said conduit adjacent the lower most end thereof so as to lie appreciably below the base of said subassembly but above said means defining said tortuous path.

12. A sewage treatment apparatus according to claim 1 including a secondary effluent holding chamber disposed downstream of said filtering means and upstream, adjacent said chemical treatment chamber.

13. A sewage treatment apparatus according to claim 12 wherein said secondary effluent holding chamber is separated from said chemical treatment chamber by a transverse baffle having a length in excess of one-half the width of said tank.

14. A sewage treatment apparatus according to claim 13 wherein said transverse baffle is imperforate and includes a section of reduced height providing a weir facilitating downstream flow of effluent from said secondary holding chamber into said chemical treatment chamber responsive to the filling of the former.

15. A sewage treatment apparatus according to claim 1 wherein said filtering means of clause (d) of claim 1 comprises a plurality of primary enlarged, relatively coarse filters and said apparatus additionally includes a plurality of secondary, relatively finer filters located downstream of said chemical treatment chamber.

16. An apparatus according to claim 15 wherein said plurality of secondary filters are disposed in a predetermined sequence relative to the path of flow of effluent downstream of said chemical treatment chamber with the most upstream of said secondary filters being the coarsest of the group and each successive filter disposed downstream thereof being progressively finer than the preceding filter.

17. A sewage treatment apparatus according to claim 10 wherein said settling and flotation chambers are separated from said chemical treatment chamber by a transverse baffle joined to the base of said subassembly and extending across the width thereof and upwardly toward the top of said tank and said settling and flotation chambers are defined by a plurality of spaced, vertical, longitudinally extending baffles joined to the said base and extending from the downstream wall of said transverse baffle to the end of said subassembly most remote from said chemical treatment chamber.

18. A sewage treatment apparatus according to claim 17 wherein said transverse baffle has at least one opening formed therein adjacent one end thereof and adjacent the said base of said subassembly to provide for the egress of effluent from said chemical treatment chamber to the most upstream of said settling and flotation chambers, said opening having a filter overlying the upstream end thereof to inhibit the passage of larger solid matter from said chemical treatment chamber into the first of said settling and flotation chambers.

19. A sewage treatment apparatus according to claim 18 wherein each of said longitudinal baffles has at least one opening formed therein and each of said openings has a filter overlying the upstream side thereof, said openings being alternately disposed adjacent the opposite longitudinal ends of succeeding baffles and alternately adjacent the upper and lower regions of succeeding baffles to provide for said extending flow path of the effluent downstream of said chemical treatment chamber and the settling and flotation of solid particulate matter out of solution in the effluent during passage of the effluent through said chamber toward said means of clause (g), claim 1.

20. A sewage treatment apparatus according to claim 19 wherein each of said filters overlying said openings in said longitudinal baffles is progressively finer than the preceding filter in said series of filters.

21. A sewage treatment apparatus according to claim 19 including means connected to said tank for periodically injecting an additional amount of chemical into the effluent present in one of the intermediate of said settling and flotation chambers defining the said extended flow path to provide for a concentrated chemical attack on any organic matter remaining in the already highly clarified effluent present in said chamber and thereby effecting a further substantial reduction of the biological demand of the oxygen present in the effluent prior to discharge from said apparatus.

* * * * *